US008391270B2

(12) United States Patent
Van Der Stok et al.

(10) Patent No.: US 8,391,270 B2
(45) Date of Patent: Mar. 5, 2013

(54) NETWORK SYNCHRONIZATION WITH REDUCED ENERGY CONSUMPTION

(75) Inventors: Petris Desiderius Victor Van Der Stok, Eindhoven (NL); Marc Aoun, Eindhoven (NL); Nicolaas Lambert, Eindhoven (NL); Julien Catalano, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 553 days.

(21) Appl. No.: 12/664,493

(22) PCT Filed: Jun. 9, 2008

(86) PCT No.: PCT/IB2008/052248
§ 371 (c)(1),
(2), (4) Date: Dec. 14, 2009

(87) PCT Pub. No.: WO2008/152554
PCT Pub. Date: Dec. 18, 2008

(65) Prior Publication Data
US 2010/0177763 A1 Jul. 15, 2010

(30) Foreign Application Priority Data
Jun. 14, 2007 (EP) .................................... 07110240

(51) Int. Cl.
*H04J 3/06* (2006.01)
(52) U.S. Cl. ........................................ 370/350; 370/503
(58) Field of Classification Search ........................ None
See application file for complete search history.

(56) References Cited

U.S. PATENT DOCUMENTS

| | | | | |
|---|---|---|---|---|
| 6,347,084 B1 * | 2/2002 | Hulyalkar et al. | ............ | 370/347 |
| 6,510,150 B1 * | 1/2003 | Ngo | ............................... | 370/347 |
| 6,611,922 B2 * | 8/2003 | Ozcetin et al. | ................ | 713/400 |
| 7,043,651 B2 * | 5/2006 | Aweya et al. | ................. | 713/400 |
| 7,058,729 B1 * | 6/2006 | Le Scolan et al. | ............ | 709/248 |
| 7,343,255 B2 * | 3/2008 | Osterloh et al. | ................ | 702/62 |
| 7,809,131 B1 * | 10/2010 | Njemanze et al. | ................ | 380/2 |
| 2006/0009927 A1 * | 1/2006 | Osterloh et al. | ................ | 702/46 |

OTHER PUBLICATIONS

Kutschke, et al; "Billoir Fitter for Cleo II"; CBX 96-20; Sep. 2, 1996; pp. 1-78.*
Kutschke, Robert; "Example of a Kalman filter on a straight line"; Mar. 13, 1998; pp. 1-11.*
Welch, et al; "An Introduction to the Kalman Filter"; TR 95-041; Jul. 24, 2006; pp. 1-16.*
Maroti, M., et al. The flooding time synchronisation protocol; 2004; Proc. of Int'l. Conf. Embedded Networked Sensor Systems; vol. 2; pp. 39-49.
Sivrikaya, F., et al.; Time Synchronization in Sensor Networks: A Survey; 2004; IEEE Network; 18(4)45-50.

* cited by examiner

*Primary Examiner* — Robert Scheibel

(57) ABSTRACT

A network (100) comprises at least a network device (110) and a further network device (120). The network device (110) arranged for detecting an event (170), for receiving a first timestamp (420) of the further network device and for taking a second timestamp. The network device is arranged for providing a signal (180) in dependence of a counter (450) reaching an end count. The network device arranged for synchronizing the signal (180) with a further signal (190) provided by the further network device (120) by adjusting a value of the end count (60) to a modified end count (230), the modified end count being in dependence of the first and second timestamp. After having provided the synchronized signal (180c, 180d) the value of the end count is re-adjusted from the modified end count to its value prior to the adjustment.

16 Claims, 6 Drawing Sheets

NETWORK SYNCHRONIZATION WITH REDUCED ENERGY CONSUMPTION

FIELD OF THE INVENTION

The invention relates to a network device for use in a network comprising at least the network device and a further network device, the network device and the further network device comprising means arranged for detecting an event, means for receiving a first timestamp of the further network device, and means for taking a second timestamp. The invention further relates to a network comprising at least two of said network devices. The invention further relates to a method for synchronization of a signal provided by a network device and a further signal provided by a further network device.

BACKGROUND OF THE INVENTION

A network device according to the opening paragraph may be used in a sensor network. Sensor networks require a common notion of time among the network devices. In 'Time Synchronization in Sensor Networks: A survey', by Fikret Sivrikaya et, al., IEEE Network, July/August 2004, time synchronization in wireless networks such as sensor networks is discussed. Time synchronization in a network aims to provide a common timescale for local clocks of the network devices comprised in the network. A common notion of time is for example needed to be able to correlate measurement data taken by multiple network devices. To enable a correlation of the measurements each measurement is given a timestamp reflecting the time at which the measurement was done. This induces a need for synchronization of the clocks of the network devices.

Commonly network time synchronization methods rely on some sort of message exchange between network devices. Such a message may comprise a timestamp including a clock value of a sending network device. On receiving said message a receiving network device may compare its clock value with the received timestamp included in the message and synchronize its clock. However the local clock of the receiving network device may drift away from time to time from the local clock of the sending network device causing a recurring need to synchronize said local clocks.

In a wireless network the network device may have a limited energy source such as a battery. Each clock synchronization requires the exchange of time stamps and a sequence of calculations, and thus each synchronization causes energy consumption.

It is therefore a problem that while the available energy source of the network device may be limited the calculations involved in the time synchronization between network devices contribute to the energy consumption and a reduction of battery life.

SUMMARY OF THE INVENTION

It is an object of the invention to provide a network device for use in a network comprising at least the network device and a further network device that enables time synchronization at a reduced energy consumption.

This object is achieved with the network device comprising at least the network device and a further network device, the network device and the further network device comprising means arranged for detecting an event, means for receiving a first timestamp of the further network device, and means for taking a second timestamp. The network device comprises the features of being arranged for providing a signal, comprising synchronization means arranged for synchronizing the signal with a further signal provided by the further network device, said synchronization means comprising a counter arranged for counting cyclically from a start count to an end count and providing the signal in dependence of the counter reaching the end count, and in response to the detection of the event adjusting a value of the end count to a modified end count, said modified end count being in dependence of the first and second timestamp, after providing the signal in dependence of the counter reaching the modified end value adjusting the value of the end count to its value prior to the adjustment to the modified end count. The cyclically counting counter comprised in each network device provides the signal when its counter value reaches the end count. The time synchronization of the network device and the further network device is achieved by synchronizing the signal with the further signal. For the synchronization of the signal with the further signal the network device adjusts in response to the detection of the event the value of the end count to the modified end count. The modified end count is dependent on the first and second timestamps that were both taken at detection of the event. As a result of the adjustment the signal provided by the network device will be either advanced or delayed in time. After having provided the advanced or delayed signal the previous value of the end count is restored. As a result the network device has synchronized its signal with the further signal with a minimum on computational effort. By limiting the computational effort fur time synchronization the energy consumption required for time synchronization between network devices is reduced, thereby achieving the object of the invention.

An embodiment of the network device is arranged for providing a signal. A synchronization unit synchronizes the signal with a further signal provided by a further network device. The synchronization unit includes a counter for counting cyclically from a start count to an end count, and provides the signal in dependence of the counter reaching the end count. In response to the detection of the event, a value of the end count is adjusted to a modified end count, which is in dependence of the first and second timestamp. After providing the signal in dependence of the counter reaching the modified end value, the value of the end count is adjusted to its value prior to the adjustment to the modified end count. This embodiment has the advantage that it may synchronize its signal with the further signal provided by the further network device with a minimum on computation effort, thereby saving its available energy source.

Another embodiment of the network device as further includes means arranged for creating an other event; means arranged for detecting the other event; means for sending a third timestamp to the other network device in response to the detection of the other event, the third timestamp comprising a third counter value corresponding to the detection of the other event has the advantage that the network device may create the event and an other network device may synchronize its other signal with the signal of the network device. Thus, the network device may act as a sender in a sender-receiver scenario and as a receiver in a sender-receiver scenario with the further network device acting as the sender network device.

In a further embodiment of a network device as the synchronization means further comprising a further counter for providing a further counter value and arranged for being updated each time when the counter value has reached the end count, the first timestamp further comprising a first further counter value corresponding to the detection of the event by the further network device, the network device being further arranged to comprise in the second timestamp a second further counter value corresponding to the detection of the event, the network device further comprising skew determining means arranged to determine a skew between a plurality of signals and a plurality of further signals of the further network device, said skew determining means comprising storage means arranged for in response to the detection of the event storing a data set comprising the first and second timestamp, the skew determining means further comprising processing means arranged for processing the data set and providing the skew, the synchronization means being further arranged for adjusting the value of one or both of the start count and end count of the counter in dependence of the provided skew has the advantage that the skew between the signals and the further signals may be calculated and the start and or end count of the counter be adjusted in dependence of said skew. As a consequence it may require a less frequent exchange of timestamps and consequently less computational effort to keep the plurality of signals of the network device and the plurality of further signals of the further network device synchronized despite of small differences in a count rate between the network device and the further network device, thereby saving on power consumption.

In a further embodiment of the network device, the processing means comprise the Kalman filter providing the advantage that the computational effort to estimate the skew is further reduced, thereby further saving on power consumption.

Another embodiment of the network has the advantage that measurements performed by network devices comprised in the network may be synchronized. A measurement performed by the network device may be initiated by the signal. A further measurement performed by the further network device may be initiated by the further signal. By synchronizing the signal and the further signal, the measurement and the further measurement may be synchronized. Thus the synchronization of the measurement and the further measurement is realized at a reduced energy consumption by each one of the network devices involved in the synchronization. This is especially advantageous for wireless sensor networks wherein each one of the sensors has a limited and not serviceable energy source.

An embodiment of a method provides a synchronization of the signals provided by the network device and further network device with a minimum on computational effort. With the synchronized signal and further signal measurements on these nodes may be synchronized and correlated. By limiting the computational effort for synchronization of the network device and the further network device the energy consumption of the network device is reduced.

In a further embodiment of the method, the first and second time stamp comprise a first and second counter value. Thus the modified end value is dependent on the first and second counter value.

In a further embodiment of the method, the event may be created by the network device that wants to synchronize its signal with the further signal of the further network device. Also the further network device may create the event resulting in a synchronization of the signal with the further signal. Further also an other network device may create the event. Thus a network comprising the network device, the further network device and the other network device has the advantage that each of said network devices may take the initiative for synchronization and generate the event.

A further embodiment of the method has the advantage that the synchronization of the signal with the further signal is achieved soon after the network device has received the first timestamp. The network device compares its counter with the modified end count which is between the start count and end count.

A further embodiment of the method gives a delayed synchronization. However the method may be favourable when the method is implemented with software running on a processor. The execution of the instructions to calculate the modified end count may take a longer time than the time necessary for the counter to reach said modified end count, especially as said modified end count is close to the start count. To prevent this it may be preferred to compare the counter with a modified end count that is larger than the end count thereby giving the processor more time for the execution of its instructions to calculate said modified end count.

A further embodiment of the method provides a repeated synchronization of the signal and the further signal. Because of spread between components and differences in ambient conditions such as temperature the counter of the further network device may count at a slightly different rate than the counter of the network device. As a consequence some time after having performed the steps of the method, the synchronization of the signal and the further signal may be lost again. To prevent this from happening the steps of the method must be repeated after some time. Therefore the further embodiment of the method has the advantage of providing a continued synchronization of the signal and the further signal.

A further embodiment of the method has the advantage that the repetition rate of performing the steps of the method may be reduced, thereby further reducing the energy consumption required for synchronization. When because of spread between components and differences in ambient conditions such as temperature the counter of the further network device counts at a slightly different rate than the counter of the network device, causing skew between the plurality of further signals and the plurality of signals, the start count and or end count of the counter of the network device may be changed to keep the plurality of signals synchronized with the plurality of further signals.

A further embodiment of the method has the advantage of providing an accurate set of data for calculation of the skew as the set of data comprising the data set and the further data set is not corrupted by performing the steps of the method.

A further embodiment of the method provides a means to calculate the skew from the set of data comprising the data set and the further data set. For the processing of the set of data the Kalman filter is used. An advantage of the application of a Kalman filter for the estimation of the skew is the short time it takes for signal of the network device to become synchronized with the further signal of the further network device. A further advantage of the application of the Kalman filter is that the computational effort to obtain the estimate of the skew is less than with a prior art processing using linear-regression. Thus with the application of the Kalman filter the energy consumption of the network device may be further reduced.

These and other aspects of the invention are apparent from and will be elucidated with reference to the embodiments described hereinafter.

DETAILED DESCRIPTION OF THE EMBODIMENTS

The advances in micro electro-mechanical systems (MEMS) technology, in digital circuit design, integration and packaging, and in wireless communication are leading to smaller, cheaper and lower power sensing and computing devices. These advances enable a creation of networks comprising a plurality of tiny computing network devices interacting with the environment and communicating with each other.

An example of such a network may be a wireless sensor network used for monitoring applications, each one of the sensors being comprised in a network device and corresponding to a wireless node of the network. An example of a monitoring application is an application wherein wireless sensors are used to monitor the structural health of a building or a bridge. In another example wireless sensors may be used for constant monitoring of people having certain medical conditions.

In these applications the energy source of each network device will be limited and for many of these network devices the energy source will not be serviceable because these network devices are at remote and difficult accessible locations.

In a network comprising a plurality of network devices time synchronization between some or all of the network devices may be needed to synchronize tasks executed by some or all of the network devices. Some kind of global time base common to all network devices may be needed to correlate measurement data taken on multiple nodes and to initiate the measurements on some or all of the network devices in a synchronized fashion.

Figure 1:
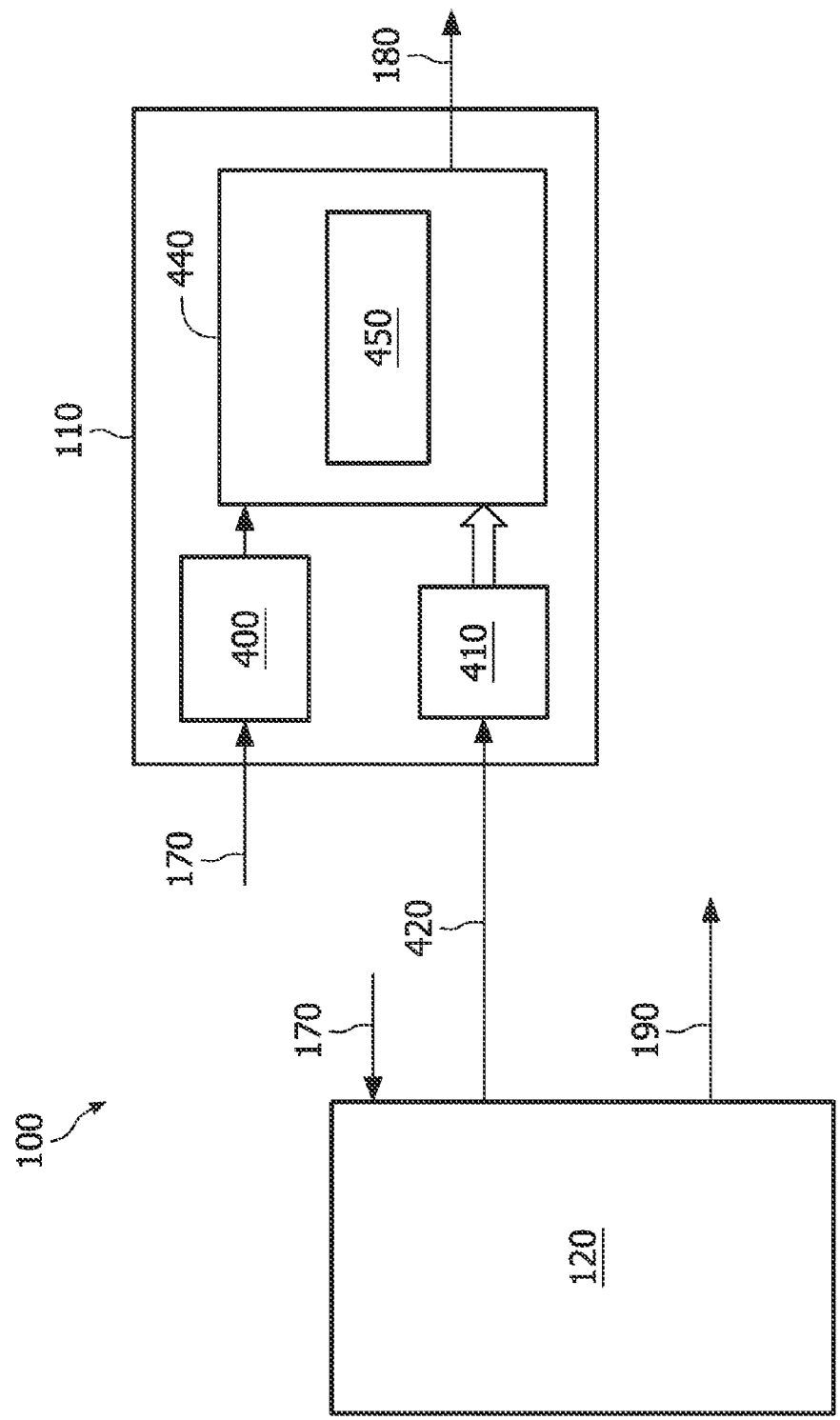
FIG. 1 shows an embodiment of a network device comprised in a network.

FIG. 1 shows a network 100 comprising a network device 110 and a further network device 120. The network device 110 is arranged to provide a signal 180 and the further network device 120 is arranged to provide a further signal 190. The network device 110 comprises a synchronization means 440 arranged for synchronizing the signal with the further signal. The signal may be used by the network device to start a measurement, and by synchronizing the signal with the further signal the measurement may be synchronized with a further measurement performed by the further network device. To synchronize the signal 180 with the further signal 190 the network device 110 receives a first timestamp 420 of the further network device 120 comprising a 'snapshot' of a local time value of the further network device, and compares that with a 'snapshot' of its own local time value that is comprised in a second time stamp. It is important that the first and second timestamps are taken at the same or almost the same moment, or with a deterministic delay between them.

In a sender-receiver scenario the further network device 120 sends the first timestamp to the network device 110 which will take the second timestamp. By comparing the timestamps the network device 110 may adjust, i.e. delay or advance its signal 180 thereby synchronizing the signal 180 of the network device 110 to the further signal 190 of the further network device 120. To achieve this the further network device 120 creates an event 170 and takes the first timestamp (i.e a snapshot) of its local time value. Once the network device 110 detects the event it will take a second timestamp of its local time value. Assuming the delay it takes for the event to be noticed by the network device 110 after it has been created by the further network device is negligibly small, or can be measured, the first and second timestamps have been taken at approximately a same moment, or with a delay that can be corrected for.

In another sender-receiver scenario the network device 110 creates the event 170 and takes the second timestamp of its local time. Once the further network device 120 detects the event it will take the first timestamp of its local time value and send the first timestamp to the network device 110.

The event 170 may be a common occurrence that happens at the network device and further network device 110, 120. Either the network device or the further network device 110, 120 may create the event 170 as long as the event is common to both network devices.

Figure 2:
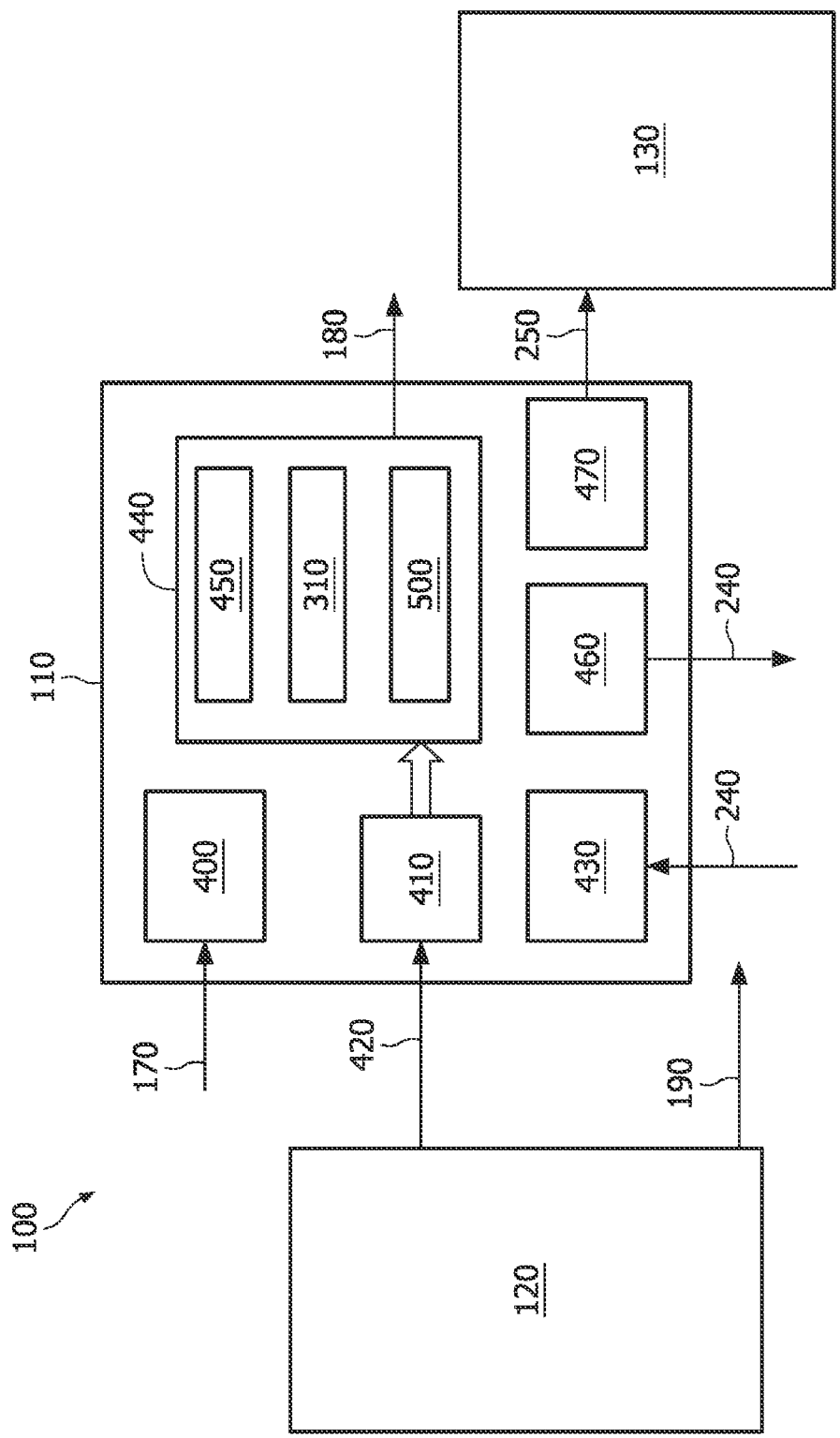
FIG. 2 shows a further embodiment of a network device comprised in a network.

In a receiver-receiver scenario an other network device 130, shown in FIG. 2, is also included in the network 100 and creates the event 170 that is detected by both the network and further network device 110, 120. Once the network device and further network device 110, 120 detect the event the first and second timestamps are taken. To synchronize the network device 110 with the further network device 120 the further network device 120 sends the first timestamp to the network device. By comparing the timestamps the network device 110 may adjust, i.e. delay or advance in time its signal 180 thereby synchronizing it to the further signal 190.

Figure 3A:
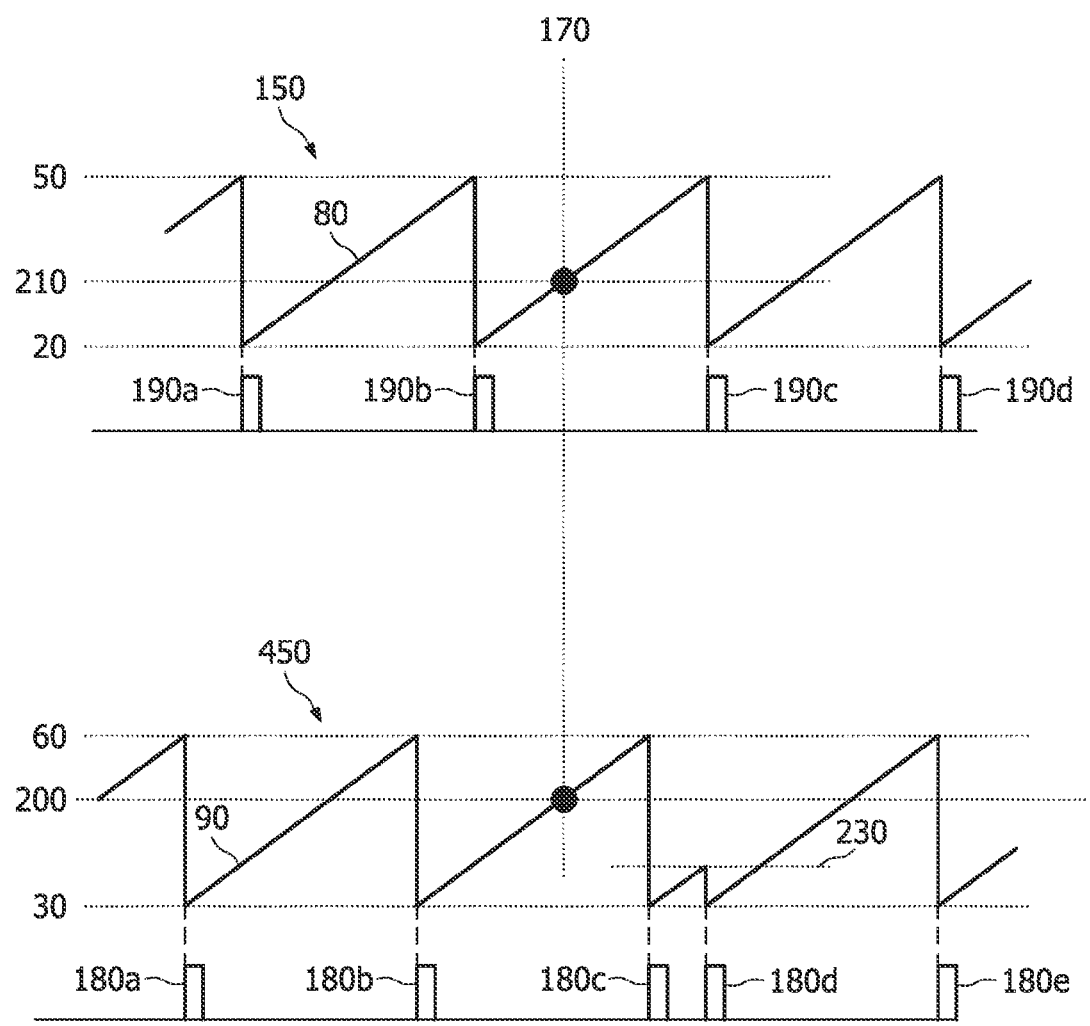
FIG. 3a shows an 'as soon as possible' synchronization.

FIG. 3a shows more details on synchronization of the signal 180 and the further signal 190. As shown in FIG. 2 in the invention the network device and the further network device comprise synchronization means 440. The synchronization means comprise a counter 150, 450 that is arranged to provide a counter value 80, 90 and count cyclically from a start count 20, 30 to an end count 50, 60. Said start count 20, 30 is initially set to a predetermined start count value, but may change in response to a skew compensation step that is discussed later. The end count 50, 60 is initially set to a predetermined end count value, but may change in response to a major correction step that also is discussed later. The end count value may further change in response to the skew compensation step. The counter value 80, 90 is reset to the start count 20, 30 upon reaching the end count 50, 60. Each time the counter 150, 450 resets, the synchronization means 440 provide the further signal and the signal, and as the counter is arranged to count cyclically a plurality of further signals 190a, 190b, 190c, 190d and a plurality of signals 180a, 180b, 180c, 180d is provided.

Although in the following discussion the counter 150, 45 is incremented periodically the counter may also be realized with a counter that is periodically decremented. With a counter that is incremented periodically the end count will be larger than the start count and with a counter that is decremented periodically the end count will be smaller than the start count.

When synchronizing the signal 180 from the plurality of signals with the further signal 190 from the plurality of further signals the counter value 90 of the network device 110 will become equal to the counter value 80 of the further network device 120. The signal 180d provided by the network device 110 that is synchronized to the further signal 190e provided by the further network device 120 may be used to start a task such as a measurement. Thus by synchronizing the signal 180d and the further signal 190e the measurements of the network device and the further network device 110, 120 may be synchronized.

Referring to FIG. 1 and FIG. 3, the network device 110 for use in the network 100 comprises means 400 arranged for detecting the event 170 and means 410 for receiving the first timestamp 420 of the further network device 120, and means for taking a second timestamp. The network device 110 is arranged to provide the signal 180 and comprises synchronization means 440 arranged for synchronizing the signal 180 with the further signal 190 provided by the further network device 120. Said synchronization means 440 comprise a counter 450 that arranged for counting cyclically from a start count to an end count, and providing the signal 180 in dependence of the counter reaching the end count, and in response to the detection of the event 170 adjusting a value of the end count 60 to a modified end count 230, said modified end count being in dependence of the first and second timestamp, after providing the signal 180d in dependence of the counter reaching the modified end value adjusting the value of the end count to its value 60 prior to the adjustment to the modified end count.

Referring to FIG. 1 and FIG. 2 likewise a method for synchronisation of the signal 180 from the plurality of signals provided by the network device 110 and the further signal 190 from the plurality of further signals provided by the further network device 120 comprises the steps of the further network device 120 taking a first timestamp 420 in response to a detection of an event 170;

the network device 110 taking a second timestamp in response to a detection of the event 170;

the network device 110 receiving the first timestamp 420 from the further network device 120;

the network device 110 providing the signal 180a, 180b, 180c, 180d in dependence of a cyclically counting counter 450 reaching an end count 60, the counter counting from a start count 30 to the end count, adjusting the end count 60 in response to the detection of the event 170 to a modified end count 230, said modified end count being in dependence of the first and second timestamp, after providing the signal 180d in dependence of the counter reaching the modified end count adjusting the modified end count 230 to the end count 60.

The network device 110 has the advantage that its counter 450 may be synchronized with the counter 150 of the further network device 120. Thus the local time value of the network device represented by its counter value 90 may be synchronized with the local time of the further network device represented by its counter value 80. The first timestamp sent to the network device comprises a first counter value 210 provided by the counter of the further network device. Said first counter value 210 corresponds to the detection of the event 170 by the further network device. Upon detection of said event 170 the network device 110 takes a second timestamp comprising a second counter value 200. The modified end count is dependent on said first 210 and second counter value 200. The synchronization requires little computational effort, thereby saving on power consumption.

The network device may act as a master in a network 100, creating an other event 240 and sending a third timestamp to the other network device 130. The other network device 130 will synchronize its counter to the counter 450 of the network device 110. Thus with a plurality of network devices as defined in claim 3 a network 100 may be created wherein the network devices 110, 120, 130 of the network may synchronize their counters and signals.

Returning to FIGS. 3a and 3b, the synchronization of the counters 450, 150 of the network device and the further network device 110, 120, and thus also the synchronization of the signal 180 and the further signal 190 may be done in at least two possible ways: an 'as soon as possible' synchronization, shown in FIG. 3a, or a 'delayed' synchronization, shown in FIG. 3b.

A further embodiment of the method defines the 'as soon as possible' synchronization. In FIG. 3a the first timestamp comprises a first counter value 210 that is smaller than a second counter value 200 that is included in the second timestamp. Consequently the modified end count 230 is calculated as the sum of the start count 30 of the counter 450 of the network device 110 and the difference between the second counter value 200 included in the second timestamp and the received first counter value 210 included in the first timestamp;

However when the first counter value 210 comprised in the first timestamp is larger than the second counter value 200 included in the second timestamp the modified end count 230 is calculated as the difference between the end count 60 of the counter 450 of the network device 110 and the difference between the received first counter value 210 included in the first time stamp and the second counter value 200 included in the second timestamp.

In the 'as soon as possible' synchronization the counter 450 of the network device is reset upon reaching the modified end count 230 wherein said modified end count is smaller than the end count 50 of the counter.

Figure 3B:
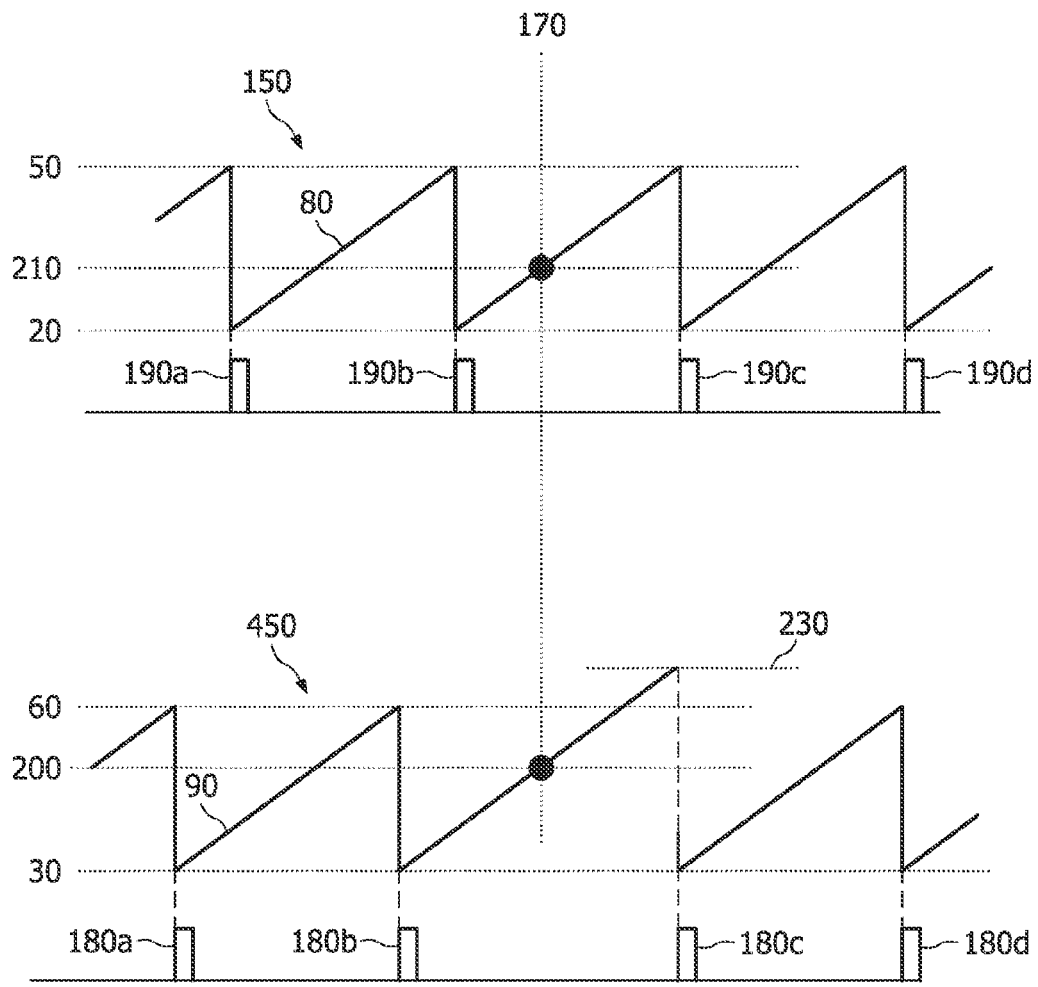
FIG. 3b shows a 'delayed' synchronization.

FIG. 3b shows a further embodiment of the method. This embodiment relates to the 'delayed' synchronization wherein the counter 450 of the further network device 110 is reset upon reaching the modified end count 230, wherein said modified end count is larger than the end count 60 of the counter 450. The modified end count 230 is calculated as the sum of the end count 60 of the counter 450 of the network device 110 and an absolute value of the difference between the second counter value 200 included in the second timestamp and the received first counter value 210 included in the first timestamp.

'Delayed' synchronization may be favourable when the method for synchronization is implemented with instructions arranged to be executed on a processor. Suppose the 'as soon as possible synchronization' and a situation wherein the first counter value 210 comprised in the first timestamp is smaller than the second counter value 200 comprised in the second timestamp. After detecting the event 170 and receiving the first timestamp a processor in the network device 110 may need to start an interrupt service routine to change the end count 60 to the modified end count 230. The value of said modified end count 230 may be small, that is close to the start count 30, and there may be a delay between an interrupt occurrence and a start of the execution of the interrupt service routine. If the delay and the execution time of the interrupt service routine is larger than the time it takes for the counter 450 of the network device 110 to reach the modified end count 230 no reset is given and said counter will keep on being incremented until it reaches a maximal possible value that may be defined by the number of bits used by the counter 450.

In the 'as soon as possible' and in the 'delayed' synchronization the end count 60 of the counter 450 of the network device 110 is changed after detection of the event 170 and in response to the reception of the first timestamp. In another embodiment of the method the counter of the network device may be arranged to count down from a start count to an end count that is smaller than said start count. After detection of the event 170 and in response to the reception of the first time stamp the start count of the counter 150 of the network device 110 may be changed. Since the counter is decremented and reset to said changed start count upon reaching the end count the chance that the delay and execution time of the interrupt service routine is larger than the time it takes for the counter 450 of the network device to reach the end count may have diminished. Thus this embodiment may be favourable for an 'as soon as possible' synchronization.

Figure 5:
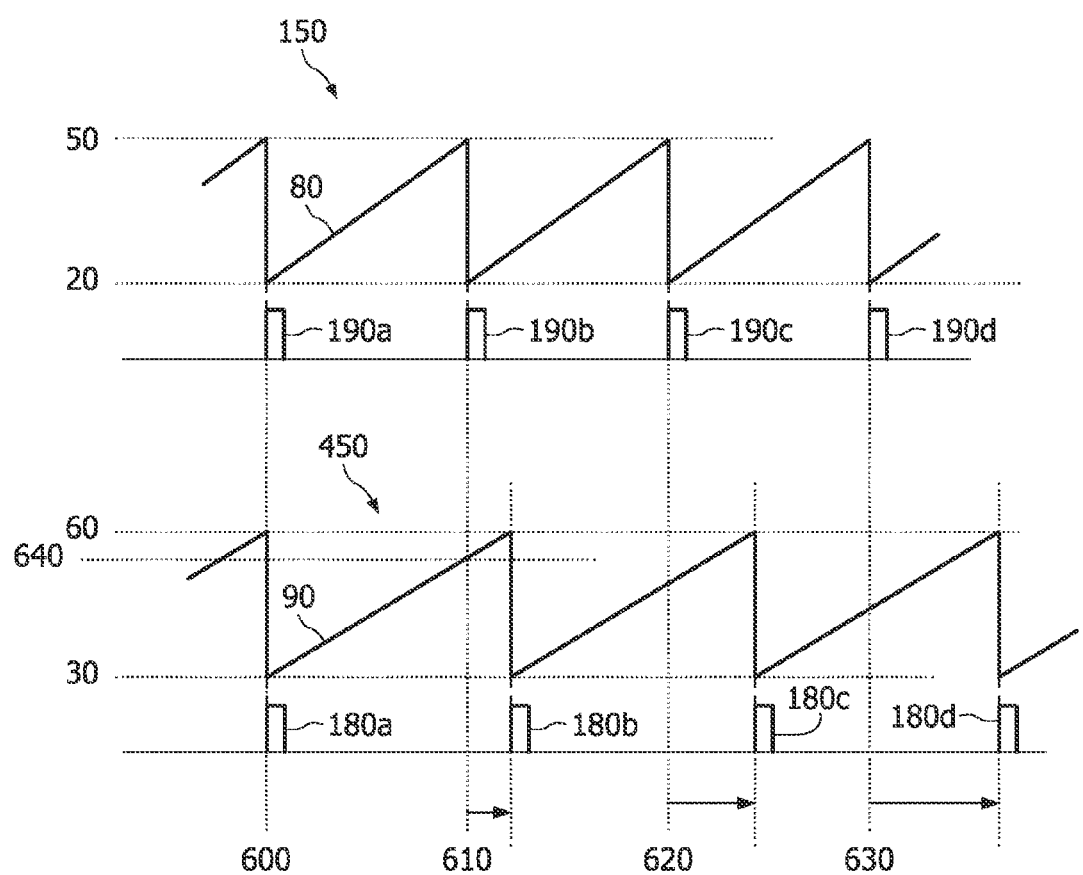
FIG. 5 shows a skew between a plurality of signals and a plurality of further signals.

Each one of the network device and the further network device 110, 120 may comprise an oscillator providing a clock signal and the counter 150, 450 of the network device and further network device may be incremented in response to said clock signal. When the oscillators of the network device and further network device 110, 120 are providing a clock signal with exactly the same frequency only one act of synchronization of the signal with the further signal would suffice to keep each future provided signal 180 and further signal 190 synchronized. It is however not likely that the oscillators of the network device and further network device 110, 120 are providing exactly the same frequency because of production spread and differences in ambient conditions such temperature. FIG. 5 shows a skew between the plurality of signals 180a, 180b, 180c, 180d provided by the network device 110 and the plurality of further signals 190a, 190b, 190c, 190d provided by the further network device 120. As discussed above it is likely that the frequencies of the clock signals of the network device 110 and the further network device 120 are different. This means that the time it takes for the network device 110 to have its counter 450 counting from the start count 30 to the end count 60 may not be equal to the time it takes for the further network device 120 to have its counter 150 counting from its start count 20 to its end count 50. When the counters 450, 150 of the network device and further network device 110, 120 are not counting at an equal counting rate synchronization between the plurality of signals 180a, 180b, 180c, 180d and the plurality of further signals 190a, 190b, 190c, 190d will be lost after a certain time. FIG. 5 shows that at a first time 600 the signal 180a and the further signal 190a are synchronized. The counting rate of the counter 150 of the further network device 120 is higher that the counting rate of the counter 450 of the network device 110 and consequently at a second time 610 the signal 180b provided by the network device 110 is delayed with respect to the further signal 190b provided by the further network device 120. At a third time 320 the delay between the signal 180c and the further signal 90c has increased further. A certain delay between the signal 180 and the further signal 90 is allowable however when the delay between the signal and the further signal is larger than a predetermined value synchronization is said to be lost. To prevent that the delay between the signal and further signal 180, 190 becomes larger than said predetermined value the method for synchronization of a signal and a further signal should be repeated. The method is referred to as the major correction step. Therefore in a further embodiment of the method for synchronization, the major correction step is repeated to keep the signal and the further signal 180, 190 provided by the network device and the further network device 110, 120 synchronized. The repetition of the major correction step may be done regularly or in dependence of a change in an ambient condition such as the temperature measured by one or more network devices 110, 120 comprised in the network 100.

To further improve the method for synchronization the repetition rate of the major correction step should be reduced to further reduce the energy consumption.

Applications of wireless sensor networks as well as many of the networking protocols they use, such as TDMA-based MAC protocols, require a common notion of time among the network devices. In a further embodiment of the method the network device and the further network device 110, 120 of the network 100 communicate with each other using a time synchronization protocol such as a Flooding Time Synchronization Protocol (FTSP). The flooding Time Synchronization Protocol (FTSP) known from 'The flooding time synchronisation protocol' by M. Maroti et. al., proceedings of the second international conference on embedded networked sensor systems, Baltimore, Md., USA, November 2004, is a protocol that may be used for time synchronization in a wireless sensor network. FTSP relies on a time stamping of time synchronization messages at a MAC-layer, and on an estimation of a clock skew between the network devices. The goal of the FTSP is to achieve a network wide synchronization of the local time values of the participating network devices. The FTSP achieves time synchronization between a sender and possibly multiple receivers utilizing a single radio message that is time-stamped at both the sender and the receiver sides. The broadcasted message contains the sender timestamp comprising a so called global time value. The receivers provide a corresponding receiver timestamp comprising their local time when receiving the message. This way one broadcast message provides a synchronization point comprising a sender and receiver timestamp to each one of the receivers.

Figure 4:
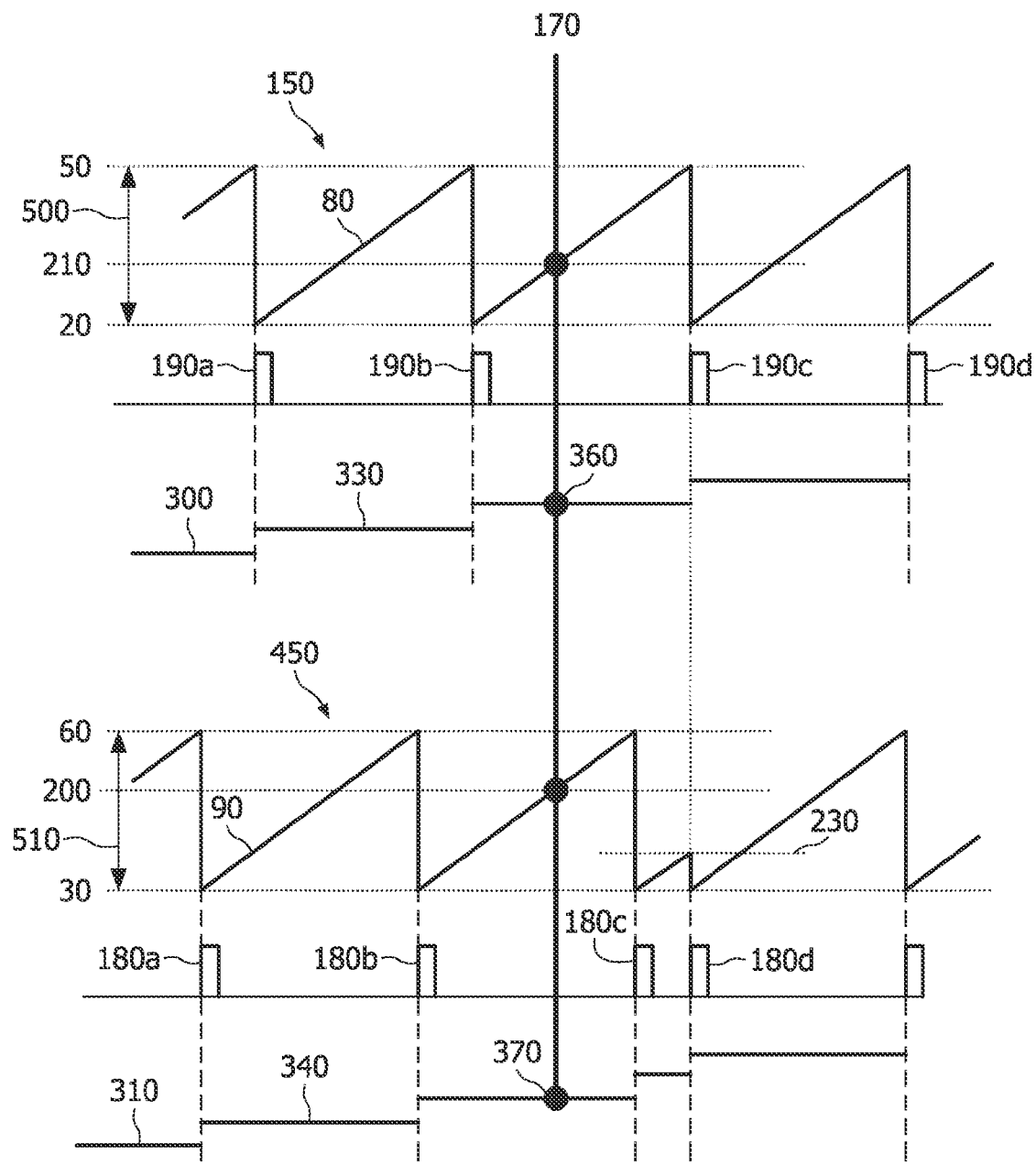
FIG. 4 shows an 'as soon as possible' synchronization using a counter and a further counter.

FIG. 4 shows a further embodiment of the method for synchronization. In said embodiment the network device and the further network device 110, 120 further comprise a further counter 310, 300 providing a further counting value 340, 330. The further counter value is updated each time when the counter value 90, 80 has reached its corresponding end count 60, 50. When the further network device 120 sends the first timestamp to the network device 110 said first timestamp comprises the first counter value 210 and a first further counter value 360 corresponding to the detection of the event 170 by the further network device. The network device 110 stores a second timestamp upon detection of the event 170, the second timestamp further comprising the counter value 200 and a second further counter value 370 of the network device corresponding to the detection of the event 170 by the network device 110. The event 170 may be a broadcast message from the further network device 120 comprising the first timestamp. The pair of first and second timestamp provides a synchronization point for the network device 110.

The counter of the network device and the further network device may be incremented in response to a clock signal provided by an oscillator. An example of the oscillator is a crystal oscillator. Instead of in hardware the counter 150, 450 may also be implemented in software. In an experimental setup the counter 150, 450 was managed in software and incremented in steps of (1/f)μs, f being the frequency of the clock signal, to generate each 320 μs the signal 190, 180, wherein the signal was used as an interrupt. Each time the interrupt occurred the further counter value 330, 340 of the further counter 300, 310, also managed in software, was incremented. To find a current local time value of the network device 110 or the further network device 120 the further counter value 340, 330 is multiplied by 320 μs and the current counter value 90, 80 divided by the frequency of the clock source is added to it.

In general, assuming linearity, a local time x on a receiving network device 110, is related to a local time y of a sending further network device 120, by the following formula $$y = \alpha \cdot x + \beta$$

wherein
- y is the local time of the further network device 120, provided by the counter value 80 and the further counter value 330 of the further network device 120;
- x is the local time of the network device 110, provided by the counter value 90 and the further counter value 340 of the network device 110;
- α is the skew between the local time value of the network device 110 and the local time value of the further network device 120;
- β is an initial time offset between the network device and further network device 110, 120.

As discussed above a single synchronization point may not be sufficient to keep the signal and the further signal 180, 190 of the network device and the further devices 110, 120 synchronized. If a short time stability of the oscillators in the network device and the further network device is good a difference in a counting rate of the counters 450, 140 will be constant and a difference or offset in the counting values 90, 80 and further counting values 340, 330 of the network device and further network device 110, 120 will change in a linear fashion. By making a data set comprising for a plurality of synchronization points their corresponding pairs of timestamps a plurality of data points may be obtained. With these data points the skew α and time offset β used in the formula as stated above may be determined. In 'The flooding time synchronisation protocol' by M. Maroti et. al. linear regression is used to find with a data set comprising 8 data points a line best approximating the relation between the local time of the network device 110 and the further network device 120. Using the dataset and least-squares linear regression the skew a between the local time values, and thereby between the signal and the further signal 180, 190 may be estimated. Knowing the skew a counting distance 510 of the counter 450 of the network device 110 may be adjusted. The counting distance 500, 510 for the counter 150, 450 is determined by an absolute value of a difference of the corresponding end count 60, 50 and start count 30, 20. To have a time between each two signals of the plurality of signals 190 provided by the network device 110 equal, or approximately equal to a time between each two further signals of the plurality of further signals 180 provided by the further network device 110 the counting distance 510 of the counter 450 comprised in the network device 110 should be made equal to the counting distance 500 of the counter 150 comprised in the further network device 120 divided by the skew α. The counting distance 510 of the counter 450 may be adjusted by changing the start count 30, or by changing the end count 60, or by changing both the start and end count 30, 60. The adjustment of the counting distance 510 of the counter 450 of the network device in response to an estimation of the skew between the local time value of the network device and local time value of the further network device 110, 120 is referred to as the skew compensation step.

Therefore an embodiment of the method for synchronization of the signal and the further signal 180, 190 of the network device and the further network device 110, 120 may comprise the major correction step followed by at least one skew compensation step.

To enable the skew compensation step, the synchronization means 440 of the network device 110 used in a further embodiment of the method for synchronization further comprise skew determining means 500 and a further counter 310, see FIG. 2. The further counter 310 is arranged for providing a further counter value 340 and said further counter value is updated (e.g. incremented) each time when the counter value 450 has reached the end count 60, 230. The first timestamp 420 received from the further network device 120 comprises the first counter value 210 and a first further counter value 360 corresponding to the detection of the event 170. The network device 110 is further arranged to comprise in the second timestamp the second counter value 200 and a second further counter value 370 corresponding to the detection of the event 170. The skew determining means 500 are arranged to determine the skew between the plurality of signals 180a, 180b provided by the network device 110 and the plurality of further signals 190a, 190b provided by the further network device 120. The skew determining means comprise storage means that are arranged to store in response to the detection of the event 170 a data set comprising the first and second timestamp. The skew determining means further comprise processing means arranged for processing the data set and providing the skew. The synchronization means 440 are further arranged for adjusting the value of one or both of the start count and end count 30, 60 of the counter 450 in dependence of the provided skew.

This embodiment has the advantage that the time between major compensation steps may be enlarged. Although network devices may be produced with 'equal' components due to production spread small differences between components will exist. Thus counters of the network devices will run with a different counting rate, even when their oscillators are supposed to provide clock signals with the same frequency. After the major compensation step synchronization may be lost requiring another major compensation step. In this embodiment the network device 110 is able to determine the skew between its plurality of signals 180 and the plurality of further signals 190 of the further network device 120. With the skew the start or end count 30, 60, or both, may be adjusted, thereby adjusting a frequency of the plurality of signals 180 to a frequency of the plurality of further signals 190 of the further network device 120. The means to determine the skew comprise a processing of a data set, the data set comprising a plurality of pairs of timestamps. A pair of timestamps comprises the first timestamp received from of the further network device 120 and the second timestamp taken by the network device 110. With the processing a relation between the local time value of the network device 110 and the local time value of the further network device 120 is determined. Since the further network device 120 is now acting as a master, the local time value of the further network device 120 is also referred to as the global time value, as the master forces the receiving network device 110 to adjust its local time value to the local time value of the master. In prior art, as discussed above, the processing is performed with a least-squares linear regression. Once the relation between the local time value and the master time value has been determined the skew and offset are calculated after which the local time value may be adjusted.

In 'The flooding time synchronisation protocol' by M. Maroti et. al. least squares linear regression is performed on a data set comprising 8 pairs of timestamps corresponding to 8 synchronization points, each synchronization point providing a pair of timestamps comprising the first and the second timestamp. To perform linear regression on the pairs of timestamps it is preferred to have the pairs of timestamps well spaced in time as this improves the accuracy of the estimate of the skew. Consequently a setup time, that is a time needed for the local time values of the network devices comprised in the network 100 to become synchronized for a first time upon deployment, is dependent on the number of pairs of timestamps comprised in the dataset. With the application of a statistical method, such as linear regression, it is generally accepted that a larger dataset will reduce the spread in the obtained values for α and β, and thus provide more accurate values for α and β. In the invention however a data set comprising two pairs of timestamps is used. In contrast with an expectation that a larger dataset may give more accurate values for the skew, experiments have shown that a small data set comprising two pairs of timestamps gives comparable performance for the synchronization. A first advantage is that by decreasing the number of pairs of timestamps used for estimating the skew the setup time is reduced. A second advantage is that the computational effort reduces with a decreasing number of pairs of timestamps, thereby further saving on power consumption. A third advantage is that less storing space, i.e. memory, is involved with a smaller dataset.

In a further embodiment of the method the estimation of the skew is not performed with linear regression but with a Kalman filter. The Kalman filter is a recursive method that is efficiently able to estimate a state of a process based on a series of noisy measurements. The recursive method comprises a set of mathematical equations that provides an efficient computational means to estimate a state of a process, in a way that minimizes the mean of a squared error. The Kalman filter is known since 1960. Due to advances in digital computing it has been the subject of application, particularly in the area of autonomous or assisted navigation. An example application is to provide accurate continuously updated information about the position and velocity of an object given only a sequence of observations about its position, each of which includes some error.

The Kalman filter follows a predictor-corrector mechanism. The filter estimates a state of the process, the state being an a priori estimate, and then receives information about the state in the form of noisy measurement. The filter will then update its estimate of the state, thereby performing a correction and thus providing an a posteriori estimate.

In the application the Kalman filter is used to estimate the state of a vector η comprising an estimated value of the offset β and skew α parameters. These parameters relate a local time value x on a receiving network device 110 to a local time value y of a sending further network device 120, by the following formula $$y = \alpha \cdot x + \beta$$

With the Kalman filter equations an estimated value of the offset and skew parameters may be obtained. A derivation of the Kalman filter equations may be found in the document 'Billoir fitter for CLEO II', by Kutschke et al, September 1996 or in the document 'Example of a Kalman filter on a straight line', by R. Kutschke, March 1998.

In the filter equations $\eta_k$ is a vector describing the estimated value of the skew α and offset β parameters and $d_m$ denotes a first value of the local time value in the network device, and σ denotes an error on $d_m$. Further $d(\eta_k)$ denotes a second value of the local time value in the network device as predicted by the vector $\eta_k$ and D denotes the derivatives of said first value with respect to the skew and the offset:

$$D_i = \frac{\partial d_m}{\partial \eta_i}$$

Further V describes a covariance matrix of the skew and offset parameter. Then, the Kalman filter equations are given by:

$$\eta_k = \eta_{k-1} + V_k \cdot D\left(\frac{d_m - d(\eta)}{\sigma^2}\right)$$

$$V_k = V_{k-1} - \left(\frac{V \cdot D \cdot D^T \cdot V}{\sigma^2 + D^T V \cdot D}\right)$$

For a detailed explanation about the Kalman filter refer to 'An introduction to the Kalman filter', by Greg Welch and Gary Bishop, University of North Carolina, Department of Computer Science, USA 1995.

Experiments have shown that for a single hop network, assuming a time master has already been elected, the setup time is 2T, whereas in 'The flooding time synchronisation protocol' by M. Maroti et. al. the setup time is 8T, T being the time between two synchronization points. Thus a first advantage of the application of a Kalman filter for the estimation of the skew is that the time it takes for the network device 110 to become synchronized to the further network device 120 decreases. A second advantage of the application of the Kalman filter for the estimation of the skew is that the computational effort to obtain the estimate of the skew with a Kalman filter is less than with a linear-regression, even if with the linear regression the data set only comprises two pairs of timestamps. Thus with the application of the Kalman filter the energy consumption of the network device 110 may be further reduced. Yet a third advantage of the application of the Kalman filter is that less storage space, i.e. memory, is involved than with linear regression. A fourth advantage of the application of a Kalman filter is its ability to adapt to a substantial increase in the time T between synchronization points.

In a further embodiment of a network device 110, the processing means comprise a Kalman filter. As explained above compared to linear regression the Kalman filter has the benefit of less computational effort. Thus the network device 110 according to this embodiment may consume less power, which is especially for wireless applications advantageous. Also the memory space involved with the processing of the data set to obtain an estimation of the skew is smaller when using the Kalman filter.

In a further embodiment of the method for the synchronization of the signal and the further signal 180, 190 of the network device and the further network device 110, 120 a sequence of the major correction step followed by at least one skew compensation step is repeated.

A major correction step following a skew compensation step will result in the counter value 90 of the network device 110 to be adjusted to the counter value 80 of the further network device 120, thereby realizing the synchronization of the signal and the further signal 180, 190. The adjusted counter value of the network device 110 will however impair the estimation of the skew between the signal and the further signal in a further skew compensation step following said major correction step. Also the skew compensation step results in an adjustment of the counter value 90 as either the start count 30 or the end count 60, or both the start count and the end count may be adjusted in response to a determined skew in the skew compensation step. Therefore in a further embodiment of the method the network device 110 may further comprise means for logging the adjustments made to its counter value 90 and further counter 340 value as a result of the major correction step and means for logging the adjustments made to the start count 30 and/or end count 60 as a result of a skew compensation step. For a skew compensation step following said major correction step or following another skew compensation step the counter value and further counter value comprised in the second timestamp are re-adjusted to their corresponding 'free running' values as if no preceding major correction step or skew compensation step has happened. Then, using a further dataset comprising a plurality of 'free running' counter and further counter values the skew between the plurality of signals 180 and the plurality of further signals 190 may be determined.

In a further embodiment of the method, each time when in response to the detection of the event the end count of the network device is changed from the end count 60 to the number 230 a difference of said end count 60 and said number 230 is stored in the further data set. Said difference reflects a change in the counter value of the network device 110 as caused by the major correction step. For the skew compensation step following the major correction step the counter value 90 of the network device 110 to be stored in the data set may be readjusted by adding said difference to said counter value 90. Thus the skew determining means may determine the skew further in dependence of said difference. An adjustment in the start count 30 or the end count 60, or both, as a result of the skew compensation step is stored in the further data set. The skew determining means may determine the skew further in dependence of the processing of the further data set.

In a further embodiment of a method, the network device 110 in the network 100 further comprises means for wireless communication for exchanging data. Said data may comprise the first timestamp received from the further network device 120, or the data may comprise a third timestamp send to the other network device 130.

A network 100 may comprise at least the network device 110 and the further network device 120. An example of such a network 100 is a body sensor network wherein each one of the network devices corresponds to a wireless node.

The invention claimed is:

1. A network device for use in a network comprising at least the network device and a further network device, the network device and the further network device comprising means arranged for detecting an event, and the network device further comprising means for receiving a first timestamp of the further network device, and means for taking a second timestamp, the network device being characterized in
being arranged for providing a signal,
comprising synchronization means arranged for synchronizing the signal with a further signal provided by the further network device,
said synchronization means comprising a counter arranged for
counting cyclically from a start count to an end count, and
providing the signal in dependence of the counter reaching the end count, and
in response to the detection of the event adjusting a value of the end count to a modified end count, said modified end count being in dependence of the first and second timestamp,
after providing the signal in dependence of the counter reaching the modified end value adjusting the value of the end count to its value prior to the adjustment to the modified end count, and
wherein the counter is further arranged for providing a counter value and the modified end count is dependent on a difference of a received first counter value comprised in the first timestamp, said first counter value corresponding to the detection of the event by the further network device, and a second counter value comprised in the second timestamp, said second counter value corresponding to the detection of the event by the network device.

2. A method for synchronisation of a network, comprising:
with a first network device, taking a first timestamp in response to a detection of an event;
with a second network device, taking a second timestamp in response to a detection of the event;
with the second network device, receiving the first timestamp from the first network device;
with the first and second network devices, providing a signal in dependence of a counter value of a cyclically counting counter reaching an end count, the counter counting from a start count to the end count;
in response to the detection of the event adjusting a value of the end count of the second network device to a modified end count, said modified end count being in dependence of the first and second timestamp;
after providing the signal in dependence of the counter value reaching the modified end count, adjusting the modified end count to the end value.

3. The method according to claim 2, wherein the modified end value of the second network device is dependent on a difference of a received first counter value comprised in the first timestamp, said first counter value corresponding to the detection of the event by the first network device, and a second counter value comprised in the second timestamp, said second counter value corresponding to the detection of the event by the second network device.

4. The method according to claim 3, further including:
creating the event by one of the first, the second, or a third network device.

5. The method according to claim 3, wherein the modified end count equals a sum of the start count of the second network device and the difference between the second counter value and the first counter value, when the second counter value is greater than the first counter value, and a difference between the end count of the second network device and the difference between the first counter value and the second counter value, when the second counter value is smaller than the first counter value.

6. The method according to claim 3, wherein the modified end count of the second network device equals the sum of the end value of the second network device and an absolute value of the difference between the second counter value and the first counter value.

7. The method according to claim 4, further comprising:
determining a skew between a plurality of signals of the second network device and a plurality of signals of the first network device; and
adjusting one or both of the end value and the start value of the second network device in dependence of the skew.

8. The method according to claim 7, wherein determining skew further includes a modified end count or a modified start count.

9. The method according to claim 7, wherein determining skew includes applying a Kalman filter.

10. The method according to claim 7, further including:
determining the start count and the end count of the second network device based on the difference between the start count and the end count of the second network device divided by the skew.

11. A plurality of network devices for use in a network, each network device comprising:
a detector which detects an event;
a receiver which receives a first timestamp;
a timestamp unit which takes a second timestamp;
a counter which counts cyclically from a start count to an end count;

a signaling unit which provides a signal each time the counter reaches the end count;

a synchronizer which in response to detection of an event adjusts a value of the end count to a modified end count, said modified end count being in dependence of the first and second timestamp, and after the signal by the signaler in dependence of the counter reaching the modified end value readjusts the value of the end count to the original end count.

12. The network device according to claim 11, wherein the modified end count includes a difference of a received first counter value comprised in the first timestamp which corresponds to the detection at the event by a different network device, and a second counter value comprised in the second timestamp which corresponds to the detection of the event by the network device.

13. The network device according to claim 12, wherein the signaling unit includes a sensor, and the signal includes a measurement from the sensor.

14. A network device according to claim 12 further comprising:

an event creator which creates the event;

a sender which sends the second timestamp to a different network device in response to the detection of the event.

15. The network device according to claim 12, further comprising:

a skew determiner which determines a skew between a plurality of signals of the signaling unit and a plurality of signals of the different network device, and includes:

storage which stores a data set comprising the first and second timestamp;

wherein the synchronizer adjusts the value of one or both of the start count and end count of the counter in dependence of the determined skew.

16. The network device according to claim 9, wherein the skew determiner includes a Kalman filter.

* * * * *